(12) United States Patent
Martin, Sr.

(10) Patent No.: US 11,364,595 B2
(45) Date of Patent: Jun. 21, 2022

(54) MATERIAL HANDLING DEVICE

(71) Applicant: Gerald A. Martin, Sr., Wintersville, OH (US)

(72) Inventor: Gerald A. Martin, Sr., Wintersville, OH (US)

(*) Notice: Subject to any disclaimer, the term of this patent is extended or adjusted under 35 U.S.C. 154(b) by 490 days.

(21) Appl. No.: 16/453,176

(22) Filed: Jun. 26, 2019

(65) Prior Publication Data

US 2020/0406428 A1 Dec. 31, 2020

(51) Int. Cl.
| | |
|---|---|
| *B25B 1/00* | (2006.01) |
| *B25B 5/14* | (2006.01) |
| *B25B 5/06* | (2006.01) |
| *B25G 1/10* | (2006.01) |
| *B65G 7/12* | (2006.01) |

(52) U.S. Cl.
CPC .............. *B25B 5/147* (2013.01); *B25B 5/067* (2013.01); *B25G 1/102* (2013.01); *B65G 7/12* (2013.01)

(58) Field of Classification Search
CPC .. B25B 5/00; B25B 3/00; B25B 5/067; B25B 5/082; B25B 5/101
See application file for complete search history.

(56) References Cited

U.S. PATENT DOCUMENTS

| | | | |
|---|---|---|---|
| 1,345,930 A | 7/1920 | Bryden | |
| 2,776,856 A | 1/1957 | Ingram | |
| 4,477,113 A | 10/1984 | Lybolt | |
| 5,156,429 A | 10/1992 | Adams | |
| 5,222,420 A | 6/1993 | Sorensen | |
| 2004/0195746 A1* | 10/2004 | Marks | B25B 5/068 269/6 |
| 2017/0216997 A1* | 8/2017 | Smith | B25B 5/16 |
| 2018/0333827 A1* | 11/2018 | Ashmead | B25G 3/32 |
| 2019/0358780 A1* | 11/2019 | MacDonald | B23K 37/0435 |
| 2020/0406428 A1* | 12/2020 | Martin, Sr. | B25B 5/067 |

* cited by examiner

*Primary Examiner* — Lee D Wilson

(57) ABSTRACT

A material handling device for use in manipulating a tubular substrate includes a C-clamp, which in turn comprises a movable jaw that is pivotally coupled to a fixed jaw. A handle is coupled to and extends from an outer surface of the fixed jaw. An actuator is coupled to the fixed jaw. The actuator is operationally coupled to the movable jaw so that the actuator is positioned firstly to pivot the movable jaw relative to the fixed jaw to position the C-clamp in an open configuration, and, secondly, to pivot the movable jaw relative to the fixed jaw to position the C-clamp in a closed configuration. In the open configuration, the C-clamp is configured to insert a tubular substrate. In the closed configuration, the C-clamp couples to the tubular substrate, positioning a user to grasp the handle to manipulate the tubular substrate.

9 Claims, 5 Drawing Sheets

MATERIAL HANDLING DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relate to material handling devices and more particularly pertain to a new material handling device for use in manipulating a tubular substrate.

BRIEF SUMMARY OF THE INVENTION

An embodiment of the disclosure meets the needs presented above by generally comprising a C-clamp, which in turn comprises a movable jaw that is pivotally coupled to a fixed jaw. A handle is coupled to and extends from an outer surface of the fixed jaw. An actuator is coupled to the fixed jaw. The actuator is operationally coupled to the movable jaw so that the actuator is positioned firstly to pivot the movable jaw relative to the fixed jaw to position the C-clamp in an open configuration, and, secondly, to pivot the movable jaw relative to the fixed jaw to position the C-clamp in a closed configuration. In the open configuration, the C-clamp is configured to insert a tubular substrate. In the closed configuration, the C-clamp couples to the tubular substrate, positioning a user to grasp the handle to manipulate the tubular substrate.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
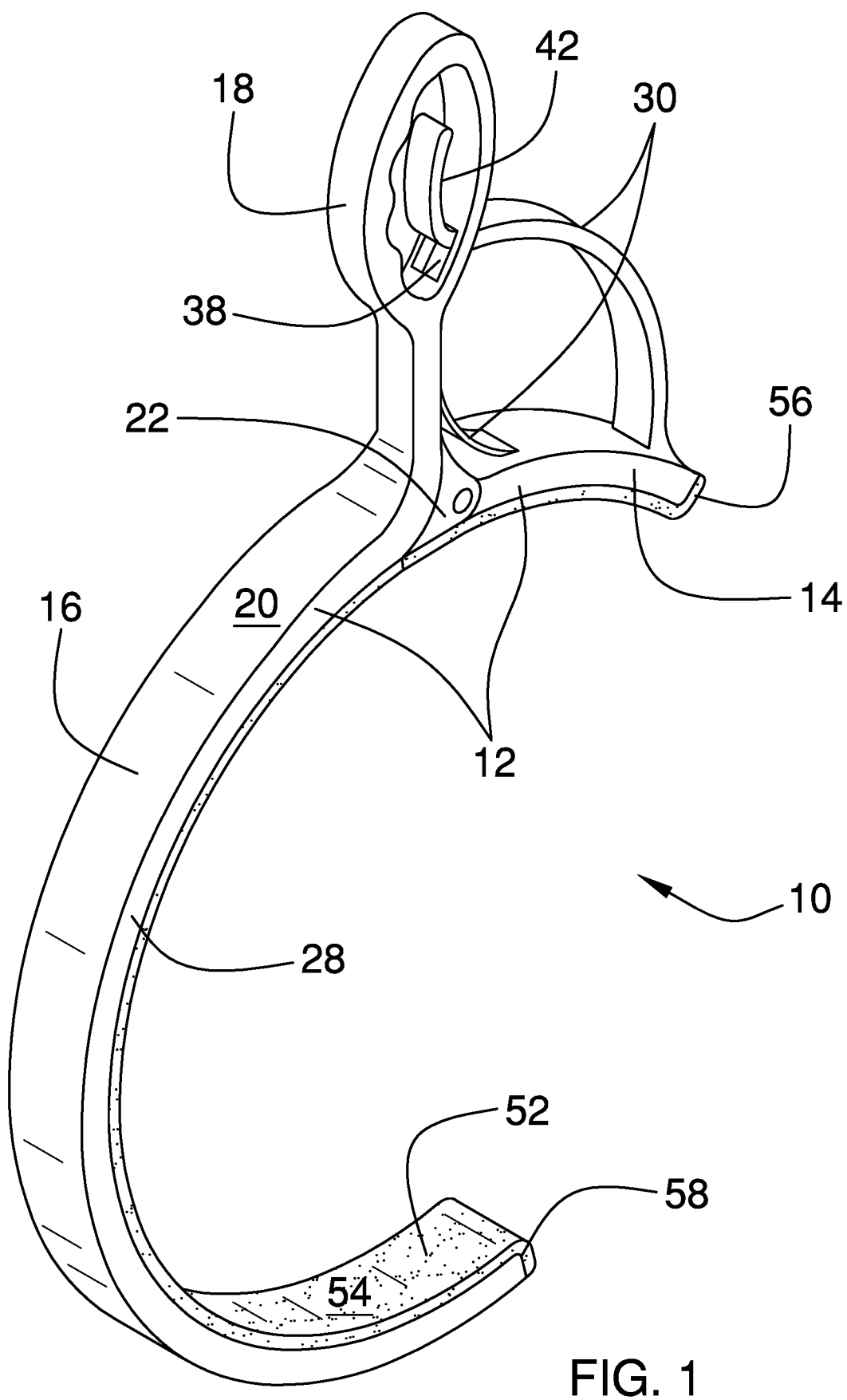
FIG. 1 is an isometric perspective view of a material handling device according to an embodiment of the disclosure.
Figure 2:
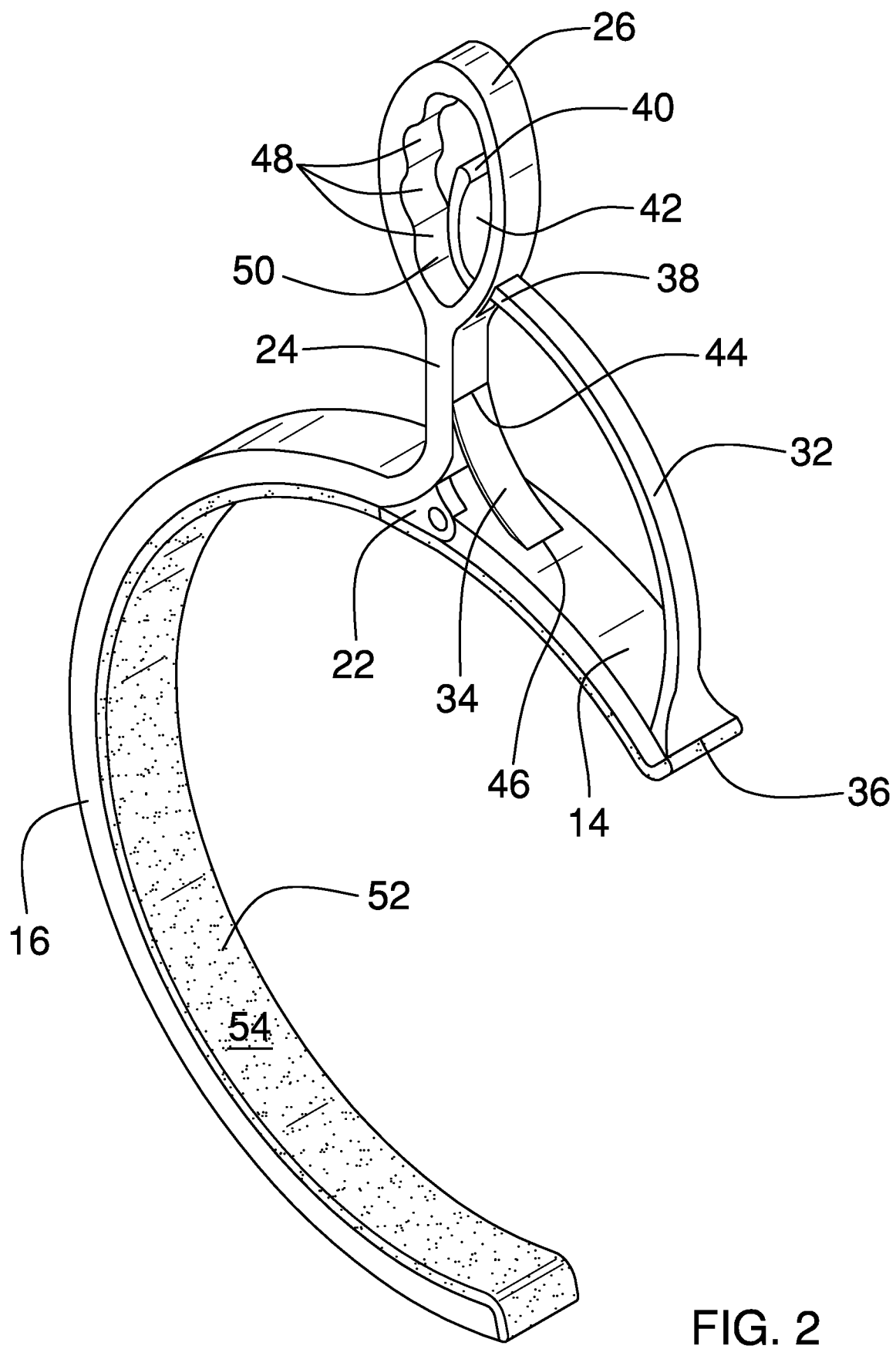
FIG. 2 is an isometric perspective view of an embodiment of the disclosure.
Figure 3:
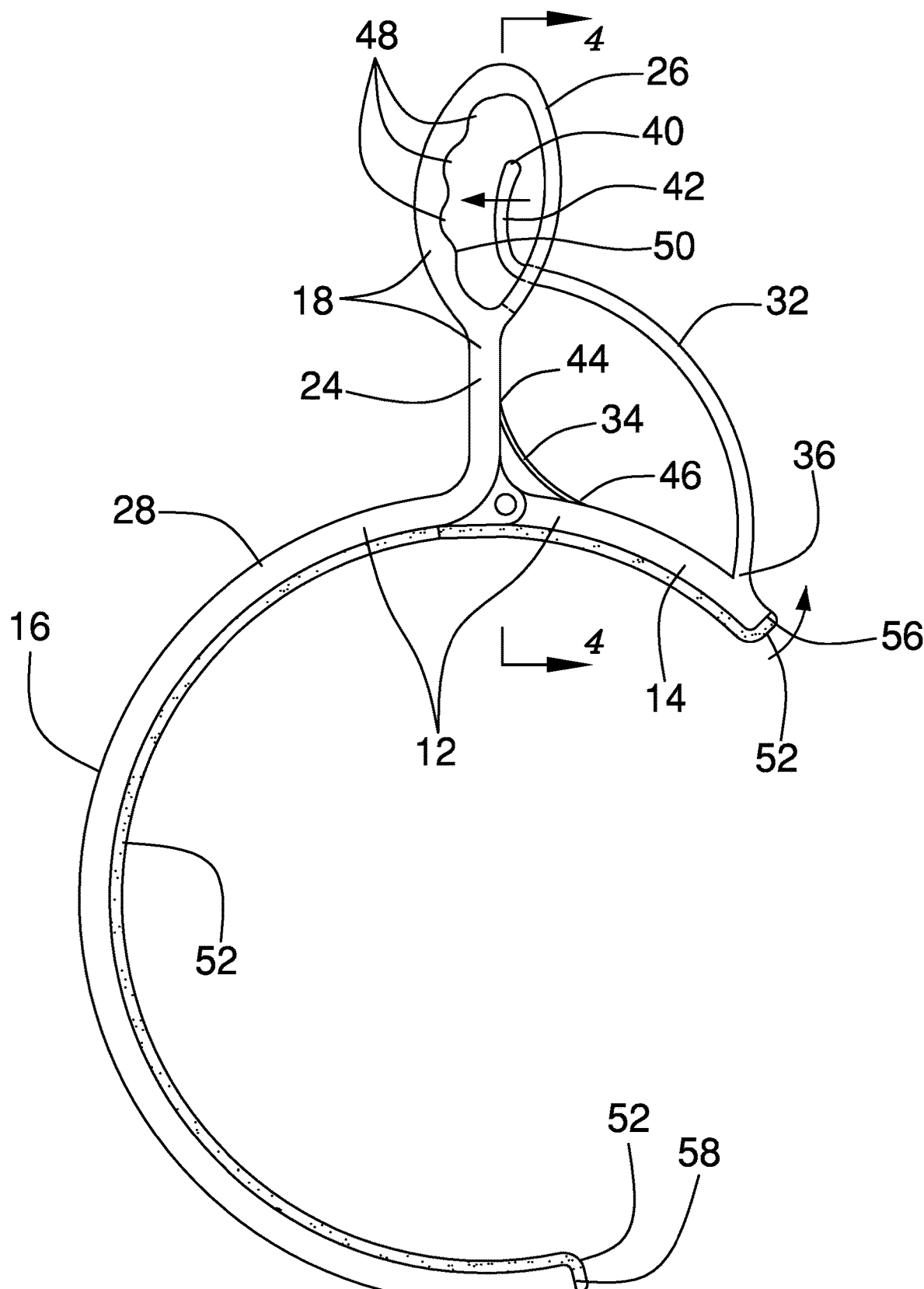
FIG. 3 is a side view of an embodiment of the disclosure.
Figure 4:
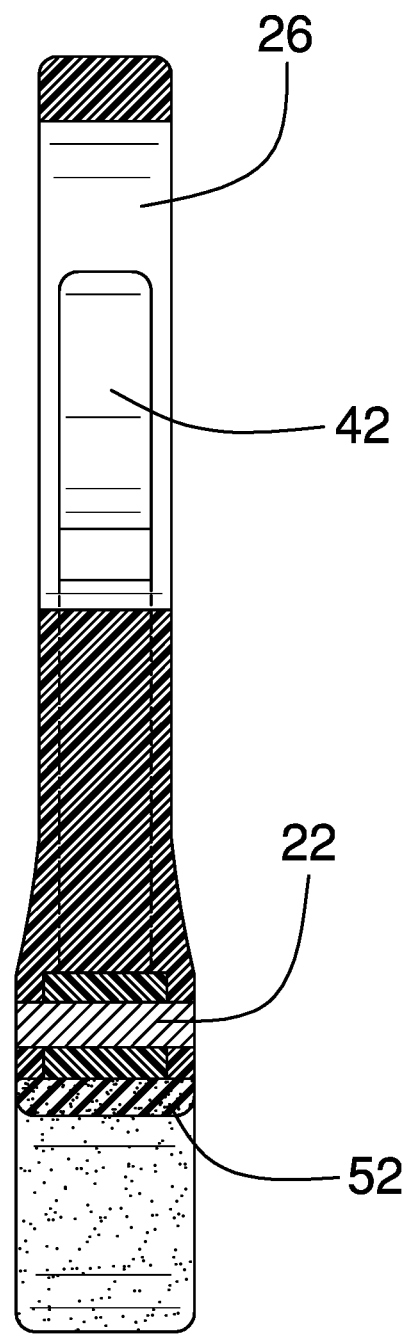
FIG. 4 is a cross-sectional view of an embodiment of the disclosure.
Figure 5:
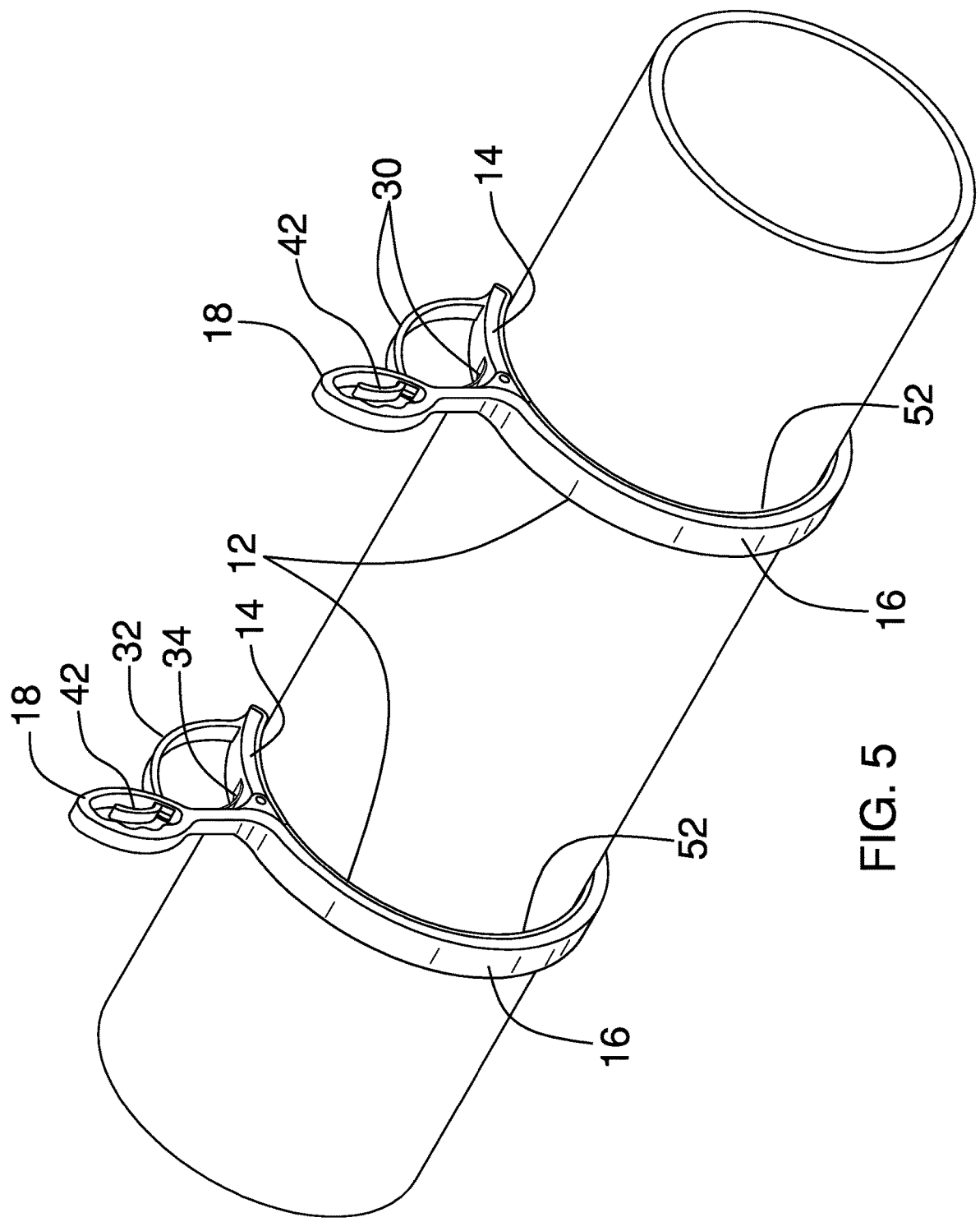
FIG. 5 is an in-use view of an embodiment of the disclosure.

With reference now to the drawings, and in particular to FIGS. 1 through 5 thereof, a new material handling device embodying the principles and concepts of an embodiment of the disclosure and generally designated by the reference numeral 10 will be described.

As best illustrated in FIGS. 1 through 5, the material handling device 10 generally comprises a C-clamp 12, which in turn comprises a movable jaw 14 that is pivotally coupled to a fixed jaw 16. The C-clamp 12 may comprise at least one of metal, metal alloy, plastic, and wood.

A handle 18 is coupled to and extends from an outer surface 20 of the fixed jaw 16. The handle 18 is coupled to the fixed jaw 16 proximate to a junction 22 of the fixed jaw 16 and the movable jaw 14. The handle 18 may comprise a shaft 24 and a ring 26, or other grasping means, such as, but not limited to, a handgrip, a curved bar, and the like. The shaft 24 is coupled to and extends from the fixed jaw 16. The ring 26 is coupled to the shaft 24 distal from the fixed jaw 16. The ring 26 is flattened ovally shaped when viewed from a side 28 of the C-clamp 12.

An actuator 30 is coupled to the fixed jaw 16. The actuator 30 is operationally coupled to the movable jaw 14 so that the actuator 30 is positioned firstly to pivot the movable jaw 14 relative to the fixed jaw 16 to position the C-clamp 12 in an open configuration, and, secondly, to pivot the movable jaw 14 relative to the fixed jaw 16 to position the C-clamp 12 in a closed configuration. In the open configuration, the C-clamp 12 is configured to insert a tubular substrate. In the closed configuration, the C-clamp 12 couples to the tubular substrate, positioning a user to grasp the handle 18 to manipulate the tubular substrate.

The device 10 facilitates handling of a variety of tubular substrates, such as metal rods, metal tubes, plastic tubes, and wooden dowels. The device 10 allows a user to separate a tubular substrate from a bundle and to reposition the tubular substrate without direct physical contact, thus reducing a potential for crush injuries, slivers, and contamination.

The actuator 30 comprises a bar 32 and a spring 34, or other actuating means, such as, but not limited to, a spring-loaded pin that is coupled to the handle 18 and which extends to the movable jaw 14, a lever coupled to the handle 18 and operationally coupled to the movable jaw 14, and the like. The bar 32 is S-shaped and has a first end 36 that is coupled to the movable jaw 14 distal from the fixed jaw 16. The bar 32 extends through a slot 38 that is positioned in the ring 26 proximate to the shaft 24. The slot 38 is substantially rectangularly shaped. A second end 40 of the bar 32 is positioned within the ring 26 to define a trigger 42.

The spring 34 is plate type and has a first terminus 44 that is coupled to the shaft 24. A second terminus 46 of the spring 34 abuts the movable jaw 14 so that the spring 34 biases the C-clamp 12 to the closed configuration. The trigger 42 is configured to position a finger of the hand of the user, positioning the user to pull the trigger 42 to pivot the movable jaw 14 relative to the fixed jaw 16, concurrent with tensioning of the spring 34, to position the C-clamp 12 in the open configuration. In the open configuration, the C-clamp 12 is configured to insert the tubular substrate. The user is positioned to release the trigger 42 so that rebounding of the spring 34 urges the C-clamp 12 to the closed configuration to couple the C-clamp 12 to the tubular substrate. The user then is positioned to grasp the handle 18 to manipulate the tubular substrate.

A plurality of indentations 48 extends into an inner circumference 50 of the ring 26 so that the indentations 48 are opposingly positioned in the ring 26 relative to the slot 38. Each indentation 48 is configured to position a respective digit of the hand of the user to enhance a grasp of the hand upon the ring 26.

A grip 52 that is coupled to an inner face 54 of the C-clamp 12 is configured to enhance coupling of the C-clamp 12 to the tubular substrate and to protect the substrate from scratching due to rotation of the C-clamp 12 relative to the tubular substrate. The grip 52 comprises at least one of rubber, silicone and foamed elastomer so that the grip 52 is resiliently compressible. The grip 52 extends over a terminus 56 of the movable jaw 14 and an endpoint 58 of the fixed jaw 16.

In use, the user pulls the trigger 42 to position the C-clamp 12 in the open configuration to insert the tubular substrate into the C-clamp 12. Releasing the trigger 42 causes the C-clamp 12 to couple to the tubular substrate, positioning the user to manipulate the tubular substrate using the handle 18.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be only one of the elements.

I claim:

1. A material handling device comprising:
   a C-clamp comprising a movable jaw pivotally coupled to a fixed jaw;
   a handle coupled to and extending from an outer surface of the fixed jaw, the handle being coupled to the fixed jaw proximate to a junction of the fixed jaw and the movable jaw;
   an actuator coupled to the fixed jaw, the actuator being operationally coupled to the movable jaw such that the actuator is positioned for firstly pivoting the movable jaw relative to the fixed jaw for positioning the C-clamp in an open configuration wherein the C-clamp is configured for inserting a tubular substrate, and, secondly, pivoting the movable jaw relative to the fixed jaw for positioning the C-clamp in a closed configuration for coupling the C-clamp to the tubular substrate positioning a user for grasping the handle for manipulating the tubular substrate;
   a shaft and a ring. the shaft being coupled to and extending from the fixed jaw, the ring being coupled to the shaft distal from the fixed law;
   a slot position in the ring proximate to the shaft; and
   the actuator comprising a bar and a spring, the bar being S-shaped, the bar having a first end coupled to the movable jaw distal from the fixed jaw, the bar extending through the slot such that a second end of the bar is positioned within the ring defining a trigger, the spring being plate type, the spring having a first terminus coupled to the shaft, a second terminus of the spring abutting the movable jaw such that the spring bias the C-clamp to the closed configuration wherein the trigger is configured for positioning a finger of the hand of the user positioning the user for pulling the trigger for pivoting the movable jaw relative to the fixed jaw, concurrent with tensioning of the spring, for positioning the C-clamp in the open configuration wherein the C-clamp is configured for inserting the tubular substrate and for releasing the trigger such that reboundin. of the spring urges the C-clamp to the closed configuration for coupling the C-clamp to the tubular substrate positioning, the user for grasping the handle for manipulating the tubular substrate.

2. The device of claim 1, further including the C-clamp comprising at least one of metal, metal alloy, plastic, and wood.

3. The device of clan 1, further including the ring being flattened ovally shaped when viewed from a side of the C-clamp.

4. The device of claim 1, further including the slot being substantially rectangularly shaped.

5. The device of claim 1, further including a grip coupled to an inner face of the C-clamp wherein the grip is configured for enhancing coupling of the C-clamp to the tubular substrate and for protecting the substrate from scratching from rotation of the C-clamp relative to the tubular substrate.

6. The device of claim 5, further including the grip comprising at least one of rubber, silicone and foamed elastomer such that the grip is resiliently compressible.

7. The device of claim 5, further including the grip extending over a terminus of the movable jaw and an endpoint of the fixed jaw.

8. The device of claim 1, further including a plurality of indentations extending into an inner circumference of the ring such that the indentations are opposingly positioned in the ring relative to the slot wherein each indentation is configured for positioning a respective digit of the hand of the user for enhancing a grasp of the hand upon the ring.

9. A material handling device comprising:
- a C-clamp comprising a movable jaw pivotally coupled to a fixed jaw, the C-clamp comprising at least one of metal, metal alloy, plastic, and wood;
- a handle coupled to and extending from an outer surface of the fixed jaw, the handle being coupled to the fixed jaw proximate to a junction of the fixed jaw and the movable jaw, the handle comprising a shaft and a ring, the shaft being coupled to and extending from the fixed jaw, the ring being coupled to the shaft distal from the fixed law, the ring being flattened ovally shaped when viewed from a side of the C-clamp;
- a slot position in the ring proximate to the shaft, the slot being substantially rectangularly shaped;
- a plurality of indentations extending into an inner circumference of the ring such that the indentations are opposingly positioned in the ring relative to the slot wherein each indentation is configured for positioning a respective digit of a hand of a user for enhancing a grasp of the hand upon the ring;
- an actuator coupled to the fixed jaw, the actuator being operationally coupled to the movable jaw such that the actuator is positioned for firstly pivoting the movable jaw relative to the fixed jaw for positioning the C-clamp in an open configuration wherein the C-clamp is configured for inserting a tubular substrate, and, secondly, pivoting the movable jaw relative to the fixed jaw for positioning the C-clamp in a closed configuration for coupling the C-clamp to the tubular substrate positioning the user for grasping the handle for manipulating the tubular substrate, the actuator comprising a bar and a spring, the bar being S-shaped, the bar having a first end coupled to the movable jaw distal from the fixed jaw, the bar extending through the slot such that a second end of the bar is positioned within the ring defining a trigger, the spring being plate type, the spring having a first terminus coupled to the shall, a second terminus of the spring abutting the movable jaw such that the spring bias the C-clamp to the closed configuration wherein the trigger is configured for positioning a finger of the hand of the user positioning the user for pulling the trigger for pivoting the movable jaw relative to the fixed jaw, concurrent with tensioning of the spring, for positioning the C-clamp in the open configuration wherein the C-clamp is configured for inserting the tubular substrate and for releasing the trigger such that rebounding of the spring urges the C-clamp to the closed configuration for coupling the C-clamp to the tubular substrate positioning the user for grasping the handle for manipulating the tubular substrate; and
- a grip coupled to an inner face of the C-clamp wherein the grip is configured for enhancing coupling of the C-clamp to the tubular substrate and for protecting the substrate from scratching from rotation of the C-clamp relative to the tubular substrate, the grip comprising at least one of rubber, silicone and foamed elastomer such that the grip is resiliently compressible, the grip extending over a terminus of the movable jaw and an endpoint of the fixed jaw.

* * * * *